United States Patent
Bizarro et al.

(10) Patent No.: US 11,062,316 B2
(45) Date of Patent: Jul. 13, 2021

(54) COMPUTER MEMORY MANAGEMENT DURING REAL-TIME FRAUDULENT TRANSACTION ANALYSIS

(71) Applicant: Feedzai—Consultadoria e Inovacao Tecnologica, S.A., Coimbra (PT)

(72) Inventors: Pedro Gustavo Santos Rodrigues Bizarro, Lisbon (PT); Mariana Rodrigues Lourenço, Lisbon (PT)

(73) Assignee: Feedzai—Consultadoria e Inovação Tecnológica, S.A., Coimbra (PT)

( * ) Notice: Subject to any disclaimer, the term of this patent is extended or adjusted under 35 U.S.C. 154(b) by 0 days.

(21) Appl. No.: 16/102,570

(22) Filed: Aug. 13, 2018

(65) Prior Publication Data
US 2019/0066111 A1    Feb. 28, 2019

Related U.S. Application Data

(60) Provisional application No. 62/545,042, filed on Aug. 14, 2017.

(51) Int. Cl.
*G06Q 20/40* (2012.01)
*G06Q 20/34* (2012.01)

(52) U.S. Cl.
CPC ......... *G06Q 20/4016* (2013.01); *G06Q 20/34* (2013.01)

(58) Field of Classification Search
CPC .... G06Q 20/4016; G06Q 20/34; G06Q 20/38; G06Q 20/40; G06Q 20/08
See application file for complete search history.

(56) References Cited

U.S. PATENT DOCUMENTS

| | | | | |
|---|---|---|---|---|
| 2003/0069820 A1* | 4/2003 | Hillmer | ................ | G06Q 20/206 705/35 |
| 2006/0149580 A1* | 7/2006 | Helsper | ................. | G06Q 30/06 235/383 |
| 2010/0094765 A1* | 4/2010 | Nandy | ................... | G06N 5/025 705/317 |

(Continued)

FOREIGN PATENT DOCUMENTS

FR    2908211    2/2009

OTHER PUBLICATIONS

Modern Payment Fraud Prevention at Big Data Scale, Feedzai (Year: 2013).*

*Primary Examiner* — Bruce I Ebersman
*Assistant Examiner* — Brock E Turk
(74) *Attorney, Agent, or Firm* — Van Pelt, Yi & James LLP

(57) ABSTRACT

Computer memory management during real-time fraudulent transaction analysis is disclosed. In an embodiment, a method includes receiving a transaction entry and determining whether the transaction entry is potentially fraudulent, including by determining whether the transaction entry is correlated with another transaction entry in the computer memory or an already-identified suspicious pattern of other transaction entries. The method further includes determining whether to evict the transaction entry from the computer memory based on the determination of whether the transaction entry is potentially fraudulent. The method includes providing a result of fraudulent transaction analysis performed using the computer memory that has been optimized.

16 Claims, 7 Drawing Sheets

(56) References Cited

U.S. PATENT DOCUMENTS

| | | | |
|---|---|---|---|
| 2010/0228580 A1* | 9/2010 | Zoldi | G06Q 10/10 |
| | | | 705/38 |
| 2010/0280927 A1* | 11/2010 | Faith | G06Q 10/06375 |
| | | | 705/30 |
| 2011/0238564 A1* | 9/2011 | Lim | G06Q 20/3223 |
| | | | 705/38 |
| 2012/0158586 A1* | 6/2012 | Ganti | G06Q 20/10 |
| | | | 705/44 |
| 2012/0295580 A1 | 11/2012 | Corner | |
| 2013/0024375 A1* | 1/2013 | Choudhuri | G06Q 20/4016 |
| | | | 705/44 |
| 2015/0161610 A1* | 6/2015 | Sahadevan | G06Q 20/40145 |
| | | | 705/44 |
| 2015/0213449 A1* | 7/2015 | Morrison | G06Q 20/4016 |
| | | | 705/44 |
| 2016/0117670 A1* | 4/2016 | Davis | G06Q 20/386 |
| | | | 705/39 |
| 2018/0053188 A1* | 2/2018 | Zoldi | G06Q 20/4016 |
| 2018/0144339 A1* | 5/2018 | Beidas | G06Q 30/06 |
| 2018/0174147 A1* | 6/2018 | Williams | G06Q 20/4016 |

* cited by examiner

Example rule:

| Find transactions with the same | [dimension] in | [time] in | [region] |
|---|---|---|---|

Issuing bank    Last 30 min   City
                                        Merchant       Last 2 h      Zipcode
                                        Amount         Last 24h     Coordinates
                                                                                                                    Geo-fenced region

FIG. 5

Example rule:

| Find transactions with the same | [dimension] in | [location] in | [region] |
|---|---|---|---|

Issuing bank    ATM        City
                                       Merchant       Store      Zipcode
                                       Amount         Website    Coordinates

| for | [#] | of | [transactions] | within | [time] |
|---|---|---|---|---|---|

1                     ATM withdrawals       5 minutes
          2                     Payment                10 minutes
          3                                                    15 minutes

FIG. 6

Example rule:

| Find transactions with the same | [dimension] in | [time] | in | [transaction] |
|---|---|---|---|---|

Issuing bank     Last 30 min     Quantity of items sold
                                     Online vendor   Last 2 h        Type of items sold
                                                                   Last week

FIG. 7

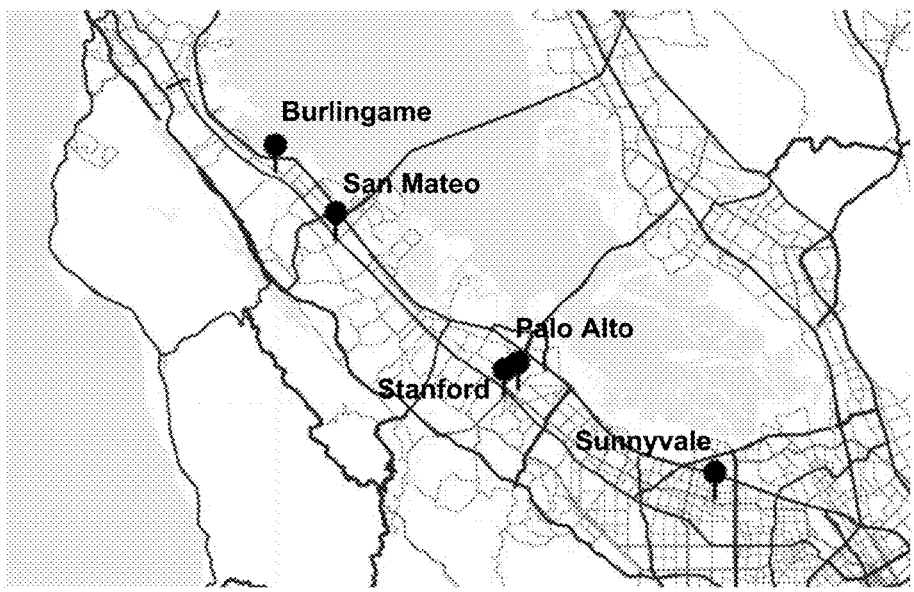

FIG. 8A

| Time | Location | Card | Amount |
|------|----------|------|--------|
| 11:08 | Burlingame | 1 | $363.61 |
| 11:09 | Burlingame | 1 | $363.61 |
| 11:07 | Burlingame | 2 | $363.61 |
| 11:08 | Burlingame | 2 | $363.61 |
| 11:08 | Burlingame | 3 | $363.61 |
| 11:10 | Burlingame | 3 | $363.61 |
| 11:57 | San Mateo | 4 | $363.61 |
| 11:58 | San Mateo | 4 | $363.61 |
| 11:57 | San Mateo | 5 | $363.61 |
| 11:59 | San Mateo | 5 | $363.61 |
| 11:56 | San Mateo | 6 | $363.61 |
| 11:57 | San Mateo | 6 | $363.61 |
| 12:51 | Palo Alto | 7 | $363.61 |
| 12:52 | Palo Alto | 7 | $363.61 |
| 12:50 | Palo Alto | 8 | $363.61 |
| 12:52 | Palo Alto | 8 | $363.61 |
| 12:51 | Palo Alto | 9 | $363.61 |
| 12:52 | Palo Alto | 9 | $363.61 |

| Time | Location | Card | Amount |
|------|----------|------|--------|
| 1:02 | Stanford | 10 | $363.61 |
| 1:03 | Stanford | 10 | $363.61 |
| 1:01 | Stanford | 11 | $363.61 |
| 1:03 | Stanford | 11 | $363.61 |
| 1:03 | Stanford | 12 | $363.61 |
| 1:05 | Stanford | 12 | $363.61 |
| 1:48 | Sunnyvale | 13 | $363.61 |
| 1:49 | Sunnyvale | 13 | $363.61 |
| 1:48 | Sunnyvale | 14 | $363.61 |
| 1:50 | Sunnyvale | 14 | $363.61 |
| 1:47 | Sunnyvale | 15 | $363.61 |
| 1:48 | Sunnyvale | 15 | $363.61 |

FIG. 8B

| Time | Card | Amount | Bank | Location |
|---|---|---|---|---|
| 10:32:15 | 1 | $500 | Bank1 | Stanford |
| 10:55:01 | 2 | $600 | Bank2 | Palo Alto |
| 10:55:59 | 3 | $600 | Bank2 | Palo Alto |
| 11:37:43 | 4 | $500 | Bank3 | Sunnyvale |
| 11:39:06 | 5 | $500 | Bank3 | Sunnyvale |
| 12:14:44 | 6 | $500 | Bank2 | Mountain View |
| 12:15:51 | 7 | $500 | Bank2 | Mountain View |
| 13:00:28 | 8 | $600 | Bank4 | Mountain View |
| 13:01:42 | 9 | $500 | Bank4 | Mountain View |
| 13:06:36 | 10 | $600 | Bank3 | Mountain View |
| 13:23:55 | 11 | $600 | Bank2 | Mountain View |
| 13:56:16 | 12 | $600 | Bank2 | Palo Alto |
| 14:12:19 | 13 | $600 | Bank5 | Palo Alto |
| 14:13:16 | 14 | $500 | Bank5 | Palo Alto |
| 15:20:14 | 15 | $600 | Bank2 | Menlo Park |
| 15:21:39 | 16 | $500 | Bank2 | Menlo Park |
| 15:27:24 | 17 | $400 | Bank3 | Menlo Park |
| 15:47:33 | 18 | $500 | Bank1 | Menlo Park |
| 15:48:37 | 19 | $400 | Bank1 | Menlo Park |
| 16:56:06 | 20 | $500 | Bank6 | Palo Alto |
| 17:00:29 | 21 | $600 | Bank6 | Palo Alto |
| 17:05:28 | 22 | $600 | Bank3 | Palo Alto |
| 17:06:37 | 23 | $500 | Bank3 | Palo Alto |
| 17:40:54 | 24 | $500 | Bank2 | Palo Alto |
| 17:41:56 | 25 | $600 | Bank2 | Palo Alto |
| 17:42:52 | 26 | $500 | Bank2 | Palo Alto |

FIG. 9

COMPUTER MEMORY MANAGEMENT DURING REAL-TIME FRAUDULENT TRANSACTION ANALYSIS

CROSS REFERENCE TO OTHER APPLICATIONS

This application claims priority to U.S. Provisional Patent Application No. 62/545,042 entitled DETECTING FRAUD-TRIP ATTACKS filed Aug. 14, 2017 which is incorporated herein by reference for all purposes.

BACKGROUND OF THE INVENTION

Electronic security measures are computer-implemented techniques to protect possessions and information. Electronic security measures are aimed at preventing security breaches including the misappropriation of information and the subsequent use of misappropriated information. A computer attempts to detect a security breach by analyzing transactional data. However, it is often difficult for a traditional computer system to efficiently, quickly, and accurately detect a security breach given the typically limited amount of computing resources, including computer memory, available to analyze vast amounts of transaction data quickly.

BRIEF DESCRIPTION OF THE DRAWINGS

Various embodiments of the invention are disclosed in the following detailed description and the accompanying drawings.

FIG. 5 shows an example of a rule for detecting fraud-trip attacks.

FIG. 6 shows an example of applying several rules to detect a fraud-trip attack.

FIG. 7 shows an example of a rule for detecting online fraud-trip attacks.

FIG. 8A shows an example of a fraud-trip attack involving product transactions.

FIG. 8B shows an example of transactions corresponding to the fraud-trip attack shown in FIG. 8A.

FIG. 9 shows an example of a fraud-trip attack involving ATM transactions.

DETAILED DESCRIPTION

Figure 1:
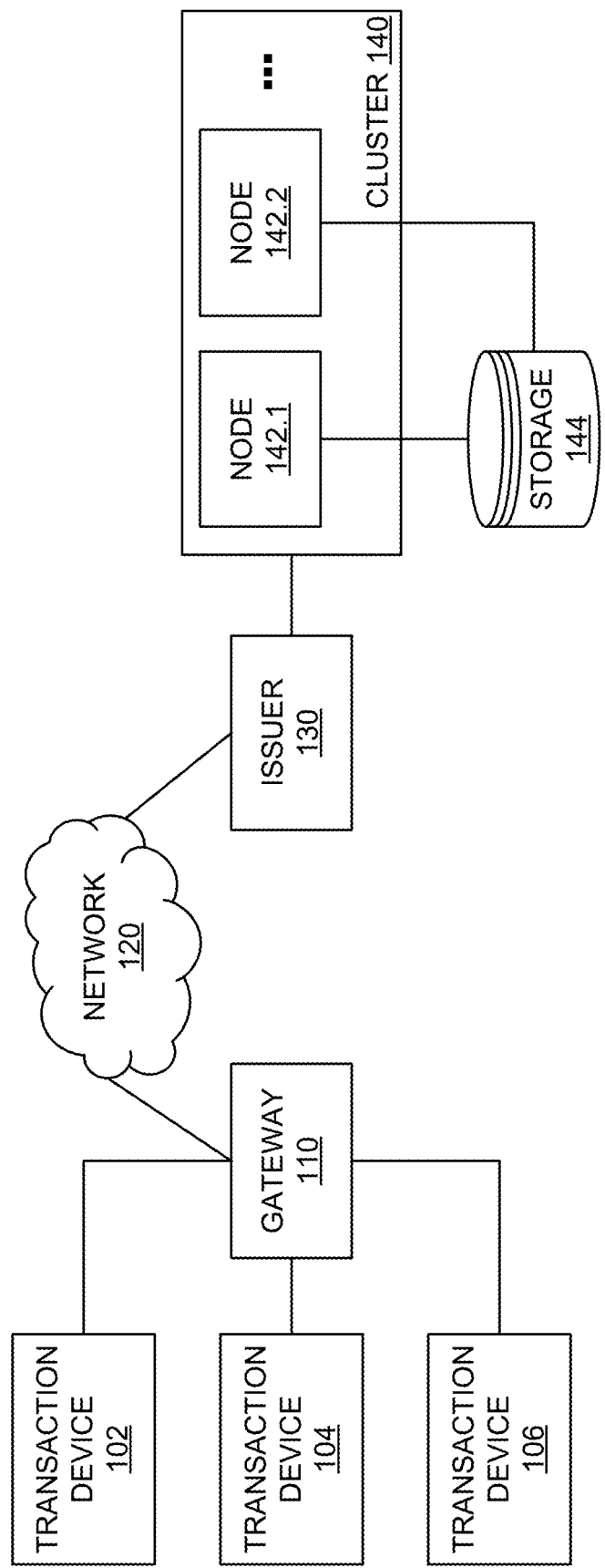
FIG. 1 is a block diagram illustrating an embodiment of a system for real-time cluster detection to determine fraud-trip attacks.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Transaction data can be analyzed to detect patterns that indicate security breaches and/or fraudulent transactions. For example, fraudulent transactions made using a stolen account may be identified among a stream of transaction records by identifying a cluster of transactions that follow a detected pattern. Thus, cluster detection techniques analyze transactional data to determine patterns in the data. Large amounts of transactional data can be received continually from data collection devices and compared with each other (including historical transactional data) to determine information about the data such as patterns of activity. Application of cluster detection techniques to a large data set typically require high memory and processing resources to store and process the large amount of data. Keeping large amounts of data in memory as candidates for matching/cluster detection is costly and often impractical. Consequently, such analysis is usually processed slowly offline and not in real-time. This results in security breaches being detected long after they have occurred, which makes the analysis less useful for taking immediate remedial measures to minimize the damage.

The computer memory management techniques disclosed here may allow real-time cluster detection that detects patterns in data in an efficient manner by efficiently utilizing memory and processing resources. The memory management techniques efficiently manage which transaction entries are stored in memory, where memory includes many types of memory including secondary memory (or disk) and main memory. For example, a determination is made of likely relevant entries and which of those entries are kept in main memory or secondary memory while other entries are periodically evicted from to make space in storage. Secondary memory includes removable mass storage devices and fixed mass storage devices. This results in a smaller data set of more relevant transaction entries remaining in memory, thus reducing the memory requirements and processing cycles for cluster detection. In some embodiments, cluster detection is performed in real-time or near real-time because analysis can be performed relatively quickly and efficiently. The techniques described here are real-time because related analysis can be completed shortly after the data is available for analysis. For example, by analyzing beginning transactions of a series of transactions, the series of transactions can be identified as suspicious while the series of transactions is still occurring.

The techniques described here find application in a variety of settings including preventing security attacks. One type of security attack is a fraud-trip, in which misappropriated information such as credit or debit cards are used to purchase and re-sell inventory. For example, a perpetrator travels from ATM to ATM (or from store to store) within a geographical area using stolen debit cards to withdraw cash (or to buy goods). A fraud-trip attack is characterized by correlated transactions. For example, a fraud-tip attack is made up of a series of transactions related by one or more features such as being within a geographical area, happening within a time frame, being associated with the same merchant or similar type of merchant, etc.

In some embodiments, a processor receives a transaction entry. The processor determines whether the transaction entry is potentially fraudulent, including by determining whether the transaction entry is correlated with another transaction entry in computer memory or an already-identified suspicious pattern of other transaction entries. For example, the received transaction entry is compared with historical activity data to determine whether the entry are potentially fraudulent. In other words, non-suspicious activity is filtered out using a similarity measure. The processor determines whether to evict the transaction entry from the computer memory based on the determination of whether the transaction entry is potentially fraudulent. A transaction entry can be evicted if it is determined to be not useful for subsequent analysis, and can be kept if it is determined to be likely relevant for subsequent analysis. This means that transaction activity data is periodically flushed from memory to make room for new data, thus efficiently managing computer memory and processing resources as well as enabling real-time detection.

Figure 3:
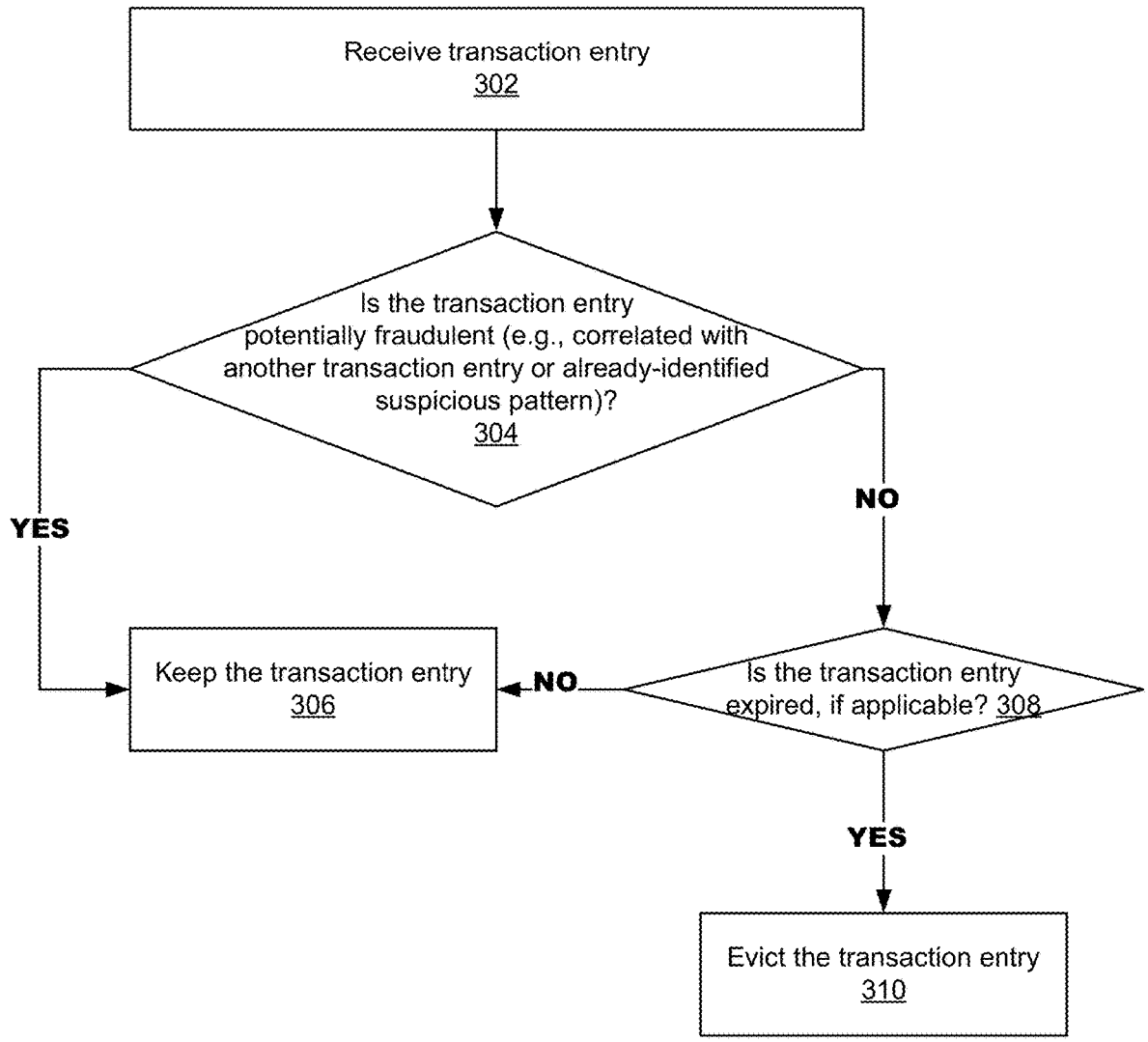
FIG. 3 is a flow chart illustrating an embodiment of a process for real-time detection of similar data such as clusters of data.

The fraud-trip attacks can be detected in real-time or near real-time, meaning that an efficient computation given limited processing and memory resources is made to provide a determination of a potentially fraudulent transaction shortly after the transaction takes place or while a series of transactions is taking place. For example, a detection process such as the one shown in FIG. 3 is performed periodically such as every 15-20 minutes, which enables a potentially fraudulent transaction to be detected relatively soon after it has occurred. In some embodiments, a perpetrator can be detected while he or she is a fraud trip or shortly after the conclusion of a fraud trip.

FIG. 1 is a block diagram illustrating an embodiment of a system for real-time cluster detection to determine fraud-trip attacks. The system includes components of an environment in which one or more nodes in a cluster 140 identify potentially fraudulent transactions. The environment includes one or more transaction devices 102, 104, 106, gateway 110, network 120, issuer 130, and a cluster 140 made up of one or more nodes 142.1, 142.2. Transaction devices 102-106 collect transaction data, and transmit the transaction data via gateway 110 to issuer 130. Issuer 130 verifies the transaction data to determine whether to approve the transaction.

A transaction includes exchange of information. For example, processing a transaction involving a purchase includes receiving account information (e.g., credit/debit) and transaction details (e.g., purchase amount) at a transaction device and determining whether to approve the transaction. An approved transaction may mean that payment by the account is accepted in exchange for goods or services. A denied transaction may mean that payment by the account is denied.

By way of non-limiting example, transaction data may include one or more of: time of transaction, account/payment information (such as a credit card account number, a debit account number, or a bank account wire number), amount paid, currency, transaction location, merchant name, merchant address, category code, city, state, zip, country, terminal identification, authentication type, and the like. In some embodiments, account data is generated by the transaction device by processing/filtering the account information. For example, an account number can be encrypted/hashed to protect the account number. A transaction device may be implemented by a terminal, a point of sale (POS) device, or any other device that accepts account information. For example, a terminal includes a credit card terminal that processes payment based on a received credit card account number. The transaction device may receive and parse account information using a variety of electronic techniques such as a chip reader, a magnetic stripe reader, bar code scanner, etc. In some embodiments, a transaction device is associated with a location and may be identified by its associated location. For example, a brick and mortar retailer (BM) having three checkout terminals (1-3) each equipped with one of the transaction devices 102-106 may be identified by transaction devices BM1, BM2, and BM3. As another example, a transaction device is a website processing payment for goods and services purchased over the Internet.

A transaction location, which is typically associated with a transaction device, is a location where account information can be received to initiate a transaction. A transaction location may be a physical/geographical location, a location of a terminal, a Web location, and the like. Examples of transaction locations include checkout terminals, stores, a group of stores, or a system-wide (e.g., entire E-commerce merchant) location, and the like.

Misappropriated information (e.g., payment information) may be presented to a transaction device 102-106 for a purchase. If misappropriated information is used, then the transaction is fraudulent. In some embodiments, during a transaction approval process or shortly after the transaction takes place, the real-time cluster detection techniques described here are applied to determine whether a transaction is potentially fraudulent. If applied during the transaction, a potentially fraudulent transaction may be prevented by declining the proffered payment method. If applied shortly after the transaction, the transaction may be reviewed and dis-approved or the payment method may be declined for subsequent transactions. This avoids future exploits of the payment method in later stages of a fraud-trip attack.

A transaction identified to be potentially fraudulent transaction can trigger remedial action such as verifying with an issuer bank or with the card holder whether the card was used without authorization. If so, then the potentially fraudulent transaction is confirmed to be actually fraudulent. The detection of potentially fraudulent transactions is useful for determining which transaction entries (among possibly hundreds of thousands) to further examine. This improves the efficiency of fraud detection by removing those transactions that are not potentially fraudulent from further analysis. In addition, the determination of potentially fraudulent transactions may be used to block a payment type associated with the potentially fraudulent transaction from being used in the future. An anticipated transaction (e.g., future location or time) can be determined/predicted, and preempted by declining the payment type. Referring to FIG. 8A, which shows an example of a fraud-trip attack, during the time it takes to get from San Mateo to Palo Alto, the potentially fraudulent transactions can be determined and when an attacker shows up on Palo Alto, he or she may be thwarted by declining a credit card. Suppose there is a transaction in Palo Alto in the same type of store as the one in San Mateo, and within short time (e.g., driving) and with the same amount and if there are also 2-3 transactions for that new card, then regardless of being a new card, the pattern still fits in the fraud-trip "signature," and is identified as potentially fraudulent.

Returning to FIG. 1, gateway 110 receives transaction data from one or more transaction devices 102-106, routes the transaction data to network 120, and returns an approval or decline notice based on the approval process of network 120. Gateway 110 may include a payment acquirer or Internet Service Provider. For example, the payment acquirer may be software hosted on a third-party server that handles transmissions between a merchant (represented by transaction devices 102-106) and an issuer 130. In some embodiments, a gateway is associated with an acquiring bank (also referred to as a merchant bank). The acquiring bank is registered with a network 120, wherein the network represents a card association or card scheme (e.g., Visa®, MasterCard®, American Express®, etc.). The acquiring bank contracts with merchants to create and maintain accounts allowing the merchant to accept accounts such as credit and debit cards. In some embodiments, gateway 110 processes and encrypts the transaction data before routing the transaction data. In some embodiments, gateway 110 groups one or more transactions together and sends the batch of transactions to issuer 130 via network 120.

Network 120 is a platform for transmitting data between devices to support payment processing and electronic payments. In some embodiments, network 120 is associated with a credit card association or card scheme (e.g., Visa®, MasterCard®, American Express®, etc.) and supports communications between association members such as an acquiring bank (e.g., gateway 110) and an issuing bank (e.g., issuer 130). In some embodiments, network 120 implements a clearing house to provide clearing and settlement services. Network 120 determines an appropriate destination to route the transaction data. For example, several issuer banks may be members of the network. The network determines the issuer corresponding to the transaction data and routes the transaction to the appropriate issuer. For simplicity, only one issuer 130 is shown in FIG. 1. In some embodiments, network 120 filters the received transaction data. For example, network 120 may be aware of fraudulent accounts and determine whether the received transaction data includes a fraudulent account. Network 120 may include one or more network connected servers for processing, routing, and/or facilitating transactions.

Issuer 130 receives transaction data from network 120 and determines whether to approve or deny a transaction (e.g., a provided account/payment). For example, issuer 130 includes one or more servers/systems of an issuing bank. In some embodiments, the issuer is associated with an acquiring bank via network 120. In some embodiments, determining whether to approve or deny an account/payment method includes determining whether the transaction is potentially fraudulent. For example, a transaction is considered potentially fraudulent if the payment method (e.g., account) is similar to other potentially fraudulent transactions as determined by a similarity measure further described with respect to FIGS. 3-7.

In some embodiments, potentially fraudulent transactions are identified periodically. In some embodiments, issuer 130 calls one or more nodes of cluster 140 to determine whether transactions are potentially fraudulent. For example, issuer 130 queries cluster 140 with one or more transactions and seeks feedback from cluster 140 about whether to proceed with the transaction. In some embodiments, if the transaction involves a possible security breach, the transaction is denied. In some embodiments, a list of (past) transactions is stored by one or more nodes of cluster 140 for a pre-determined time or is provided by issuer 130, and used to identify potentially fraudulent transactions as further described with respect to FIG. 3.

In some embodiments, nodes of cluster 140 are controlled and managed by issuer 130. For example, devices/systems of the issuer or payment processing network retain transaction information and perform analysis to identify potentially fraudulent transactions. For example, the one or more nodes may be provided within the computing environment of issuer 130. In some embodiments, nodes of cluster 140 are controlled and managed by a third party. For example, issuer 130 has contracted with the third party to perform analysis using data provided to the issuer (e.g., transaction information) to identify for the issuer likely potentially fraudulent transactions.

Figure 4:
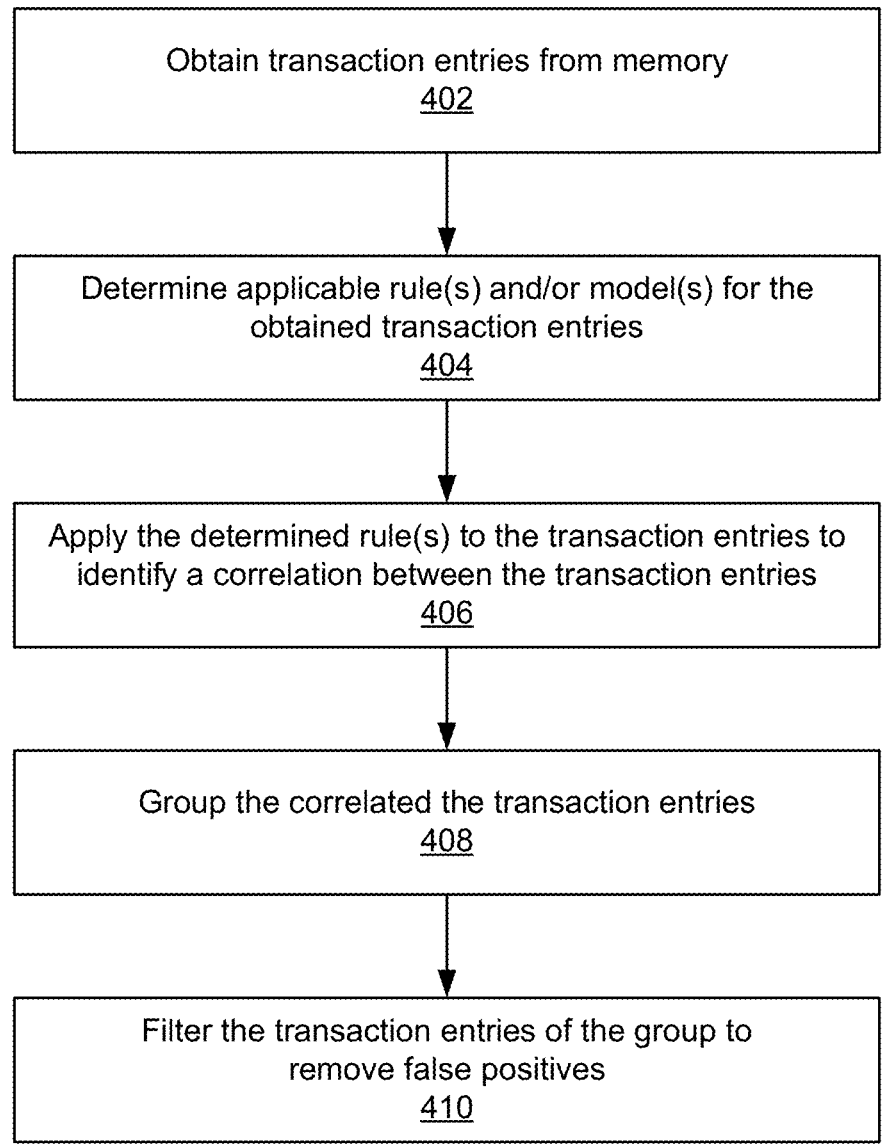
FIG. 4 is a flow chart illustrating an embodiment of a process for determining whether a transaction entry is potentially fraudulent.

One or more nodes of cluster 140 perform the processes described herein, e.g., the processes shown in FIGS. 3 and 4. The processes can be performed in parallel or distributed among the one or more nodes. In some embodiments, one or more nodes of cluster 140 receives transaction entry, analyze the transaction to determine whether it is potentially fraudulent, and provide output.

Results of potentially fraudulent transaction analysis are useful for, among other things, determining whether to allow or deny a transaction. A transaction attempted to be performed by an account identified as likely compromised is denied. As another example, transaction authorization is handled as follows. Previously identified fraudulent transactions are stored in storage 144. When performing transaction authorization based on received transaction information, issuer 130 accesses storage 144 to determine whether the received transaction information is associated with a transaction device/location previously identified as a potentially fraudulent transaction stored in storage 144. For example, if the transaction information is similar to a previously-identified potentially fraudulent transaction, the issuer denies the transaction.

Storage 144 stores information about transactions. Storage 144 can be implemented by or include a variety of storage devices including devices for a memory hierarchy (cache, RAM, ROM, disk). In some embodiments, storage 144 stores a list of potentially fraudulent transactions and/or a list of stolen/fraudulent accounts. The transaction information can be provided as a single transaction or a list of transactions. In some embodiments, a list of (past) transactions is stored in storage 144 for a pre-determined time, and is used to analyze subsequently-received transactions to provide output. Transaction data can be kept or evicted according to eviction rules like those discussed with respect to FIG. 3 to efficiently use the storage space available or to minimize the amount of space used for storing transaction entries. The process shown in FIG. 3 is an example of how transactions are analyzed by the node(s).

A payment verification process may take place within the environment shown in FIG. 1. In operation, a transaction device (102, 104, and/or 106) receives transaction information such as account, time, amount, etc. as further described herein. In some embodiments, the transaction device processes the transaction information (e.g., packages the data). The transaction device sends the transaction data to gateway 110. Gateway 110 routes the received transaction data to network 120. Network 120 determines an issuer based on the transaction data, and sends the transaction data to the issuer. Issuer 130 determines whether to approve or deny the transaction based on the transaction data and a security process performed by one or more nodes 142.1, 142.2. The security process performed by the one or more nodes includes analyzing the received transaction data to identify potentially fraudulent transactions. The process shown in FIG. 3 is an example of a security process performed by cluster 140. In some embodiments, potentially fraudulent transactions are stored such that future transactions are handled based on previously-identified potentially fraudulent transactions.

Network 120 and gateway 110 relay an approval or decline notice back to the transaction device. If the transaction is approved, payment has been accepted and the transaction is successful. If the transaction is declined, payment has not been accepted and the transaction is declined.

The following figure is shows an example of a computer system for performing cluster detection for determining fraud-trip attacks.

Figure 2:
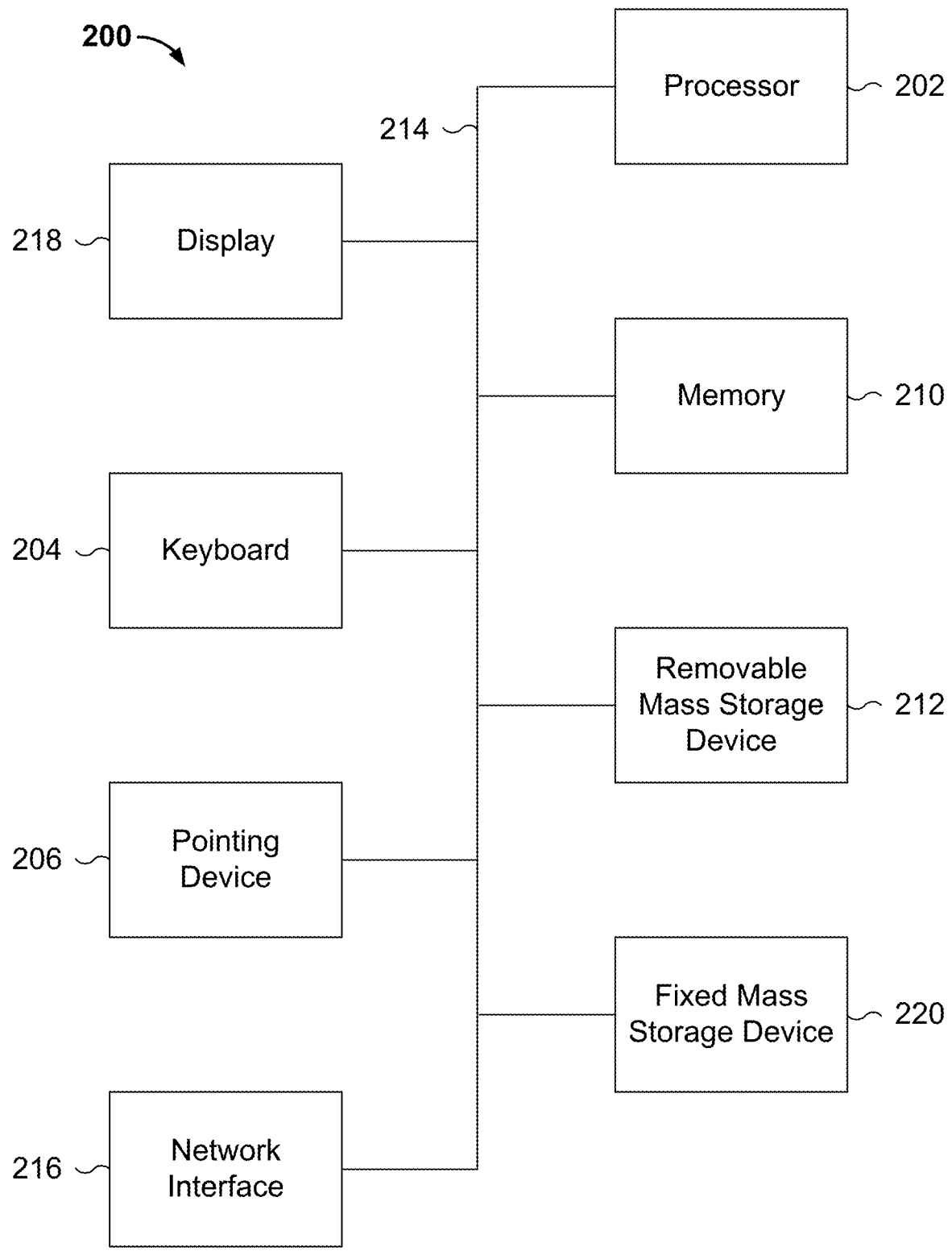
FIG. 2 is a functional diagram illustrating a programmed computer system for computer memory management during real-time fraudulent transaction analysis in accordance with some embodiments.

FIG. 2 is a functional diagram illustrating a programmed computer system for computer memory management during real-time fraudulent transaction analysis in accordance with some embodiments. As will be apparent, other computer system architectures and configurations can be used to perform the described fraud-trip attack detection technique. Computer system 200, which includes various subsystems as described below, includes at least one microprocessor subsystem (also referred to as a processor or a central processing unit (CPU) 202). For example, processor 202 can be implemented by a single-chip processor or by multiple processors. In some embodiments, processor 202 is a general purpose digital processor that controls the operation of the computer system 200. In some embodiments, processor 202 also includes one or more coprocessors or special purpose processors (e.g., a graphics processor, a network processor, etc.). Using instructions retrieved from memory 210, processor 202 controls the reception and manipulation of input data received on an input device (e.g., image processing device 206, I/O device interface 204), and the output and display of data on output devices (e.g., display 218).

Processor 202 is coupled bi-directionally with memory 210, which can include, for example, one or more random access memories (RAM) and/or one or more read-only memories (ROM). As is well known in the art, memory 210 can be used as a general storage area, a temporary (e.g., scratch pad) memory, and/or a cache memory. Memory 210 can also be used to store input data and processed data, as well as to store programming instructions and data, in the form of data objects and text objects, in addition to other data and instructions for processes operating on processor 202. Also as is well known in the art, memory 210 typically includes basic operating instructions, program code, data, and objects used by the processor 202 to perform its functions (e.g., programmed instructions). For example, memory 210 can include any suitable computer readable storage media described below, depending on whether, for example, data access needs to be bi-directional or uni-directional. For example, processor 202 can also directly and very rapidly retrieve and store frequently needed data in a cache memory included in memory 210.

A removable mass storage device 212 provides additional data storage capacity for the computer system 200, and is optionally coupled either bi-directionally (read/write) or uni-directionally (read only) to processor 202. A fixed mass storage 220 can also, for example, provide additional data storage capacity. For example, storage devices 212 and/or 220 can include computer readable media such as magnetic tape, flash memory, PC-CARDS, portable mass storage devices such as hard drives (e.g., magnetic, optical, or solid state drives), holographic storage devices, and other storage devices. Mass storages 212 and/or 220 generally store additional programming instructions, data, and the like that typically are not in active use by the processor 202. It will be appreciated that the information retained within mass storages 212 and 220 can be incorporated, if needed, in standard fashion as part of memory 210 (e.g., RAM) as virtual memory.

In addition to providing processor 202 access to storage subsystems, bus 214 can be used to provide access to other subsystems and devices as well. As shown, these can include a display 218, a network interface 216, an input/output (I/O) device interface 204, an image processing device 206, as well as other subsystems and devices. For example, image processing device 206 can include a camera, a scanner, etc.; I/O device interface 204 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 200. Multiple I/O device interfaces can be used in conjunction with computer system 200. The I/O device interface can include general and customized interfaces that allow the processor 202 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 216 allows processor 202 to be coupled to another computer, computer network, or telecommunications network using a network connection as shown. For example, through the network interface 216, the processor 202 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 202 can be used to connect the computer system 200 to an external network and transfer data according to standard protocols. For example, various process embodiments disclosed herein can be executed on processor 202, or can be performed across a network such as the Internet, intranet networks, or local area networks, in conjunction with a remote processor that shares a portion of the processing. Additional mass storage devices (not shown) can also be connected to processor 202 through network interface 216.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 204 and display 218 share the touch sensitive screen component, which both detects user inputs and displays outputs to the user). In addition, bus 214 is illustrative of any interconnection scheme serving to link the subsystems. Other computer architectures having different configurations of subsystems can also be utilized.

The computer system may be configured to perform cluster-detection. The following figure is an example of a process for real-time cluster detection.

FIG. 3 is a flow chart illustrating an embodiment of a process for real-time detection of similar data such as clusters of data.

Real-time security breach detection is challenging to implement because of the sophisticated nature of some attacks. Conventionally, fraud detection uses card profiles and merchant profiles to detect if a transaction is potentially fraudulent. A merchant profile includes expected patterns of behavior such as purchases made from the merchant. Suppose a merchant sells gift cards. A merchant profile would include common gift card denominations and expect to see payment in those common denominations. A card profile includes characteristics and transactions for which the card is expected to be used. For example, a corporate credit card is expected to be used at certain establishments but not others, used on certain days and not others, used below a threshold frequency, and the like.

Perpetrators are aware of typical card profile- and merchant profile-based fraud detection techniques, and may try to avoid detection by going from retailer to retailer using multiple cards to fool conventional fraud detectors. These fraud-trip attacks are difficult to detect by conventional fraud detectors because they are distributed in terms of stolen cards, used terminals, and geographical usage. Terminals and/or cards might be used just a few times, sometimes event just once. Fraud detection typically involves processing transactional data, which can be numerous and difficult for processors to quickly draw a conclusion about whether a transaction is potentially fraudulent. The techniques described here identify potentially fraudulent transactions without relying solely on profile-based metrics. For example, potentially fraudulent transactions may be determined to be part of a suspicious pattern of behavior even if they are not necessarily related by profile-based metrics.

Fraud-trip attacks may be detected by the real-time cluster detection process described here. When a new transaction T is received, the transaction T might be the start of a new fraud pattern, and is retained for further inspection. Received transactions are stored for a defined time period (e.g., a short while), regardless of whether they match a fraud-trip. The transactions for the defined time period are checked to see if they match a previous fraud-trip pattern or if they are the start of a new fraud-trip pattern.

The process of FIG. 3 may be at least in part implemented on one or more components of the system shown in FIG. 1. In some embodiments, process 300 is performed by processor 202 shown in FIG. 2.

A transaction entry is received (302). Referring to FIG. 1, the transaction entry may be received from gateway 110 in some embodiments. In some embodiments, transaction entries may be received from storage 144. For example, transaction entries may be collected for a period of time (e.g., 15-20 minutes) and processed in batches.

Returning to FIG. 3, a transaction entry includes several fields such as time of transaction, account/payment information, amount paid, currency, transaction location, merchant name, merchant address, category code, city, state, zip, country, terminal identification, authentication type, and the like. A field may be used to determine correlations between transaction entries. For example, transactions that take place within a geographical region may be correlated. As another example, transactions that take place within a time range may be correlated. An example of a fraud-trip made up of transactions with correlated geographical locations and times is further described with respect to FIGS. 8A, 8B, and 9.

It is determined whether the transaction entry is potentially fraudulent (304). In some embodiments, the determination of whether the transaction entry is potentially fraudulent includes determining whether the transaction entry is correlated with another transaction entry or already-identified suspicious pattern of other transaction entries. A correlation with another transaction entry indicates that they are part of the same cluster. For example, the same product purchased within the travel time between two shops may be part of a fraud-trip attack. As another example, a maximum ATM amount withdrawal at two ATMs with timestamps that indicate the same perpetrator traveled from one ATM to the next may indicate that they are part of a fraud-trip attack. The cost of the product or the withdrawal amount may be the same but are not necessarily the same. For example, an attacker might buy $50 gift cards from three different merchants, but then on the fourth merchant he buys $50 gift cards plus a pack of gum just to make up a different price. Likewise, an attacker targeting ATMs, might try to withdraw $500 in some ATMs, but $600 or $400 in others. In our fraud-trip detection, we search for patterns with identical prices, but also for others with similar but not identical prices.

If the transaction entry is potentially fraudulent, then the transaction entry is kept (306). In some embodiments, what is checked is the similarity between a transaction and one or more previous transactions. If there is sufficient similarity (e.g., within a threshold), the transaction entry is determined to be potentially fraudulent. The transaction entry is kept in computer memory such as storage 144 of FIG. 1, which may include one or more of various types of memory devices including cache, flash, RAM, ROM, any tier or storage such as disk, and the like. Potentially fraudulent transaction entries are retained in memory so that they may be used for evaluating subsequent transaction entries. Potentially fraudulent transaction entries are retained because they are likely useful for evaluating subsequent entries because they include fields that may be similar to fields of subsequent entries, which would indicate that the subsequent entries are also potentially fraudulent. Subsequent transaction entries that are correlated with stored transaction entries are determined to also be potentially fraudulent. In some embodiments, evaluation of subsequent transaction entries may increase the confidence that a transaction previously determined to be potentially fraudulent was correctly identified as such. For example, a transaction entry with a particular time stamp may be consistent with the travel time between two locations.

If the transaction entry is not potentially fraudulent, then it is determined whether the transaction entry has expired, if applicable (308). Whether a transaction entry has expired depends on a threshold/expiration period, which can be pre-defined. In some embodiments, the expiration time is set based on a size of memory. For example, if a memory is large enough to store transaction data that is expected to be received over a one-hour period of time, then the expiration time can be set to one hour or shorter, e.g., 30 minutes. Setting an expiration time allows memory to be efficiently used without retaining relatively old transaction data, which might not be as useful for real-time cluster identification.

In some embodiments, the check for whether the transaction entry is not applicable. For example, if an initial transaction is determined to be not fraudulent, and subsequently a similar entry is received increasing the likelihood that the initial transaction is potentially fraudulent, then the initial transaction is not subject to the expiration check. Instead, the initial transaction entry is retained. For example, the initial transaction entry may be retained to make comparisons with subsequent entries, which may increase or decrease the confidence that the initial transaction entry is potentially fraudulent.

If the transaction entry has expired, then the transaction entry is evicted (310). The transaction entry is removed from memory such as storage 144 of FIG. 1. Transaction entries that are both not potentially fraudulent and expired are less likely to be useful for identifying whether subsequent entries are potentially fraudulent because they will not be correlated with subsequently entries that are potentially fraudulent. Relatively older transaction entries that have also been identified as not potentially fraudulent are periodically removed to make room for new transaction data. A fraud-trip attack typically happens in a relatively short period of time, so keeping data that is a few days old is both less effective for identifying correlated transaction data and also consumes more memory resources. By determining that the transaction entry has expired and removing the entry from memory, memory resources are more efficiently used by consuming less memory and/or storing using available memory to store more relevant data.

Otherwise, if the transaction entry has not expired, the transaction entry is kept (306). In this example, transaction entries that are not potentially fraudulent are also kept so long as the entry has not expired. This means that subsequent transaction entries may be compared to relatively fresh transaction entries that are not potentially fraudulent to determine correlations. For example, the first transaction that is part of a fraud-trip attack may be initially classified as not potentially fraudulent, then retained for a period of time. When a subsequent transaction entry is received, a correlation with the first entry may be identified, causing both to be classified as potentially fraudulent. Thus, the expiration period allows a limited number of transaction entries that are initially identified to be not potentially fraudulent to be used for comparison with subsequent transactions. This balances the consumption of memory resources with accuracy of detection.

Whether two transaction entries are part of a cluster (e.g., correlated) may be identified in a variety of ways including by applying rules. The following figure is an example of a process for determining whether a transaction entry is potentially fraudulent.

FIG. 4 is a flow chart illustrating an embodiment of a process for determining whether a transaction entry is potentially fraudulent. In some embodiments, at least a portion of the process of FIG. 4 is included in 304 of FIG. 3.

Transaction entries are obtained from memory (402). Transactions may be stored for a pre-defined length of time to limit the number of entries that are processed. This can conserve both memory and processing resources. Transaction entries include fields that are processed to determine whether a transaction entry is potentially fraudulent.

Applicable rule(s) and/or model(s) are determined for the obtained transaction entries (404). Applicable rules and models include similarity metrics such as machine learning models, clustering models, similarity models, and the like. For simplicity, the examples are chiefly described using rules, but a machine learning model may be applied in addition or in place of rules. A rule includes conditions, and is applied to a transaction entry to filter through fields of an entry to determine entries that satisfy the conditions defined by the rule. A rule applied to two entries is a similarity measure because it measures the similarity or correlation between the two entries. For example, a rule may include dimensions (such as an issuing bank, card bin number, merchant, merchant type, amount of purchase, and the like), time (such as in the last 30 minutes, 2 hours, 24 hours), and region (such as city, zip code, and the like). A rule applied to the obtained transaction entries filters out those entries with field values that do not meet the conditions of the rule. The dimensions, time, region, and other conditions of a rule can be defined to identify entries that are potentially fraudulent entries. Rules that are applicable for a transaction entry may be those that have conditions that correspond to the fields of the transaction entry. In other words, a rule that checks a field that does not exist or cannot be derived from a transaction entry, then the rule is not applicable to that type of transaction entry.

Rule formation can be manual or automatic. In some embodiments, a human analyst loads/programs rules into a processor such as cluster 140 to be used to determine potentially fraudulent transactions. In some embodiments, rules can be automatically formed by a computer processor. For example, machine learning techniques can be applied to train a model to select conditions to be used for a rule. Upon confirmation that a potentially fraudulent transaction actually is fraudulent (a bank or credit card issuer might provide the confirmation for example), the machine learning model can be improved by training it with the training data. Rules may be made for certain types of transactions. For example, ATM withdrawals may be subject to rules that are different from rules for product transactions at retail stores. In some embodiments, applicable rules are determined by selecting from a list of rules. In some embodiments, applicable rules are formed after receiving transaction entries. Based on the obtained transaction entries, applicable rules are determined.

The determined rule(s) are applied to the transaction entries to identify a correlation between the entries (406). Fraudulent transactions that are part of a fraud-trip attack are typically correlated, related, or similar in at least one dimension. Although the sophisticated attacker may evade traditional fraud detection algorithms, a fraud-trip may nevertheless include patterns or characteristics (e.g., a suspicious pattern of activity) that are recognizable by applying rules used by the cluster determination techniques described here. For example, transaction entries may be correlated by geography, time, amount, and other factors. A rule may be applied to transaction entries to identify those entries that are correlated with each other. Example rules and associated conditions are further described with respect to FIG. 5.

The correlated entries are grouped (408). A group of entries are those entries that are determined to be related after applying a rule to the entries. Entries may be aggregated per field (e.g., per region and/or per slot of time such as every 15 minutes) to increase efficiency. An example of a group of product transaction entries is shown in FIG. 8B. In that example, the entries are correlated by geography because they are part of the same trip that an attacker makes in the San Francisco Bay Area to purchase iPads® with stolen credit cards to later re-sell. An example of a group of ATM transaction entries is shown in FIG. 9, which are ATM withdrawals made by an attacker using stolen debit cards.

Returning to FIG. 4, the entries of the group are filtered to remove false positives (410). A false positive is an identification of an entry to be potentially fraudulent when it is not fraudulent. Some transaction patterns may have characteristics that cause them to be grouped together as correlated when they are innocuous. In some embodiments, false positives are removed by applying a rule, which may be pre-programmed or automatically formed in the same way as the rules described above.

For example, during rush hour many people may be paying to use a toll road using their credit cards. These transactions would be logged as numerous transaction for the same amount, causing them to be grouped as correlated entries. To eliminate this false positive, transactions made at that geographical area (where the toll booths are), for a set low amount equal to the toll, and/or during rush hour may be identified as false positives and removed from the group or the entire group marked as not potentially fraudulent.

As another example, in a busy urban area, many office workers may go to lunch at the same time and purchase similar meals. This may show up as a spike in transactions with similar amounts, causing the lunch purchases to be grouped as correlated. To eliminate this false positive, transactions made at that geographical area and/or during lunch hour may be identified as false positives and removed from the group or the entire group marked as not potentially fraudulent.

The remaining set of transaction entries after false positives have been removed is a well-defined set of entries that can be processed to determine correlations using fewer processing cycles because the set is not overly large compared with those used for conventional cluster detection techniques.

The group of entries can be output for further review. A group of potentially fraudulent entries may be transmitted to an analyst for further review. The group may be compared with a database of payment instruments known to have been compromised. For example, credit cards that are reported to be stolen may be stored and used to compare with the potentially fraudulent transaction entries. Remedial measures such as those described with respect to FIG. 1 may be executed.

Correlations between transaction entries may be determined according to similarity measures such as rules. The following figures show examples of rules for determining whether a transaction is potentially fraudulent.

FIG. 5 shows an example of a rule for detecting fraud-trip attacks. Here, the rule is "find transactions with the same [dimension] in [time] in [region]," where each of the fields ("dimension," "time," and "region") are in a transaction entry or can be derived from a transaction entry. Each of the fields can be used to determine a suspicious pattern of behavior. For example, correlations between entries based on a field may reveal a suspicious pattern of behavior.

A dimension field can be used to find a vendor/purchased product relationship between transactions. For example, dimension may include an issuing bank, a merchant, or an amount. An issuing bank may be a type of bank. For example, credit cards issued by the same bank may have been stolen at the same time, and are now being used on a fraud-trip attack. Being related by being issued by the same bank may indicate potential fraud. Another example of an issuing bank is the same branch of a bank or type of card. The merchant may be a specific name of a merchant or a type of merchant such as electronics stores or ATMs.

An amount may be a range indicative of a correlation such as the maximum withdrawal permitted at that ATM. For example, for ATM transactions, $400, $500, and $600 may be considered to be similar to each other because they are typical limits per ATM withdrawal while $18 and $22 are not considered similar even though the difference in dollar amount between the two is smaller because $18 and $22 are not close to withdrawal limit.

A time field can be used to find a time relationship between transactions. For example, an attacker traveling from one city to another city would have a first transaction at a first time and a second transaction at a second time, the lapsed time between the first and second times being no shorter than the time it takes to travel between the first city and the second city. The time field may be used to identify a distributed and coordinated attack. For example, a team of perpetrators may all begin an attack at the same time in different cities. Their modus operandi may be similar except that they are in different cities. Despite being a distributed attack, which is typically not detectable by conventional techniques because of the geographical distance, the attack may nevertheless be detected by using the time field along with other fields. The time field may also be used to find transaction entries from specific times such as a long weekend, Black Friday, and other times when fraud-trip attacks are especially likely.

A region field can be used to find geographical features or relationships between retail locations or ATMs that are visited by an attacker. An attacker using a car to get from location to location would operate in a greater geographical area than an attacker using a bicycle or going by foot to get from location to location. As another example, car trips may be further distinguished by highway traveling speeds vs. local traveling speeds to set threshold distance or time limits on transactions based on an expectation of whether the attacker is traveling on the highway or locally. This can be used to eliminate some transactions from being identified as correlated because they happen earlier than a threshold time it takes to get from one place to another place. Attackers may also prefer to visit the same type of store chain, such as a Walmart® or Target®, or the same type of store, such as electronics stores, including BestBuy® or Apple®.

An amount field can be used to find an amount relationship between transactions. For example, an attacker typically uses misappropriated payment information to purchase inventory to be re-sold. They typically prefer purchasing the same type of inventory such as gift cards in common denominations, smartphones, tablets, shoes, and the like. As another example, an attacker using a stolen debit card may withdraw an amount equal to the maximum allowed per transaction or may select a common withdrawal amount presented on the screen of the ATM. If there is an insufficient balance in the bank account and a withdrawal is declined, an attacker may attempt to withdraw decreasing amounts until a transaction just below the account balance is permitted.

Some of the characteristics may be related to each other. For example, the amount may be related to a geographical feature such as zip code. A zip code may indicate the permitted daily withdrawal maximum. Rules may also be formulated based on trends. For example, in certain parts of the country some products may be more commonly purchased and resold with misappropriated payment information.

The number of fields in this example rule is merely exemplary and not intended to be limiting. For example, a rule may include four fields such as time, region, amount, and merchant type. In some embodiments, several rules may be applied in succession to the transaction entry data.

FIG. 6 shows an example of applying several rules to detect a fraud-trip attack. For example, a fraud-trip attack in which ATM withdrawals are made using stolen debit cards may be detected by first applying a rule "find transactions for [ATMs with at least 2 transactions within 10 minutes]," then applying a second rule "find transactions with amounts [$400, $500] in [ATM] in [same zip4 region]"

FIG. 7 shows an example of a rule for detecting online fraud-trip attacks. The rule shown here is similar to the one shown in FIG. 5, but distinguished by a field ("transaction") that finds transactions corresponding to online attacks. Unlike an attack in which an attacker travels from retail location to retail location, online attacks can happen from anywhere. Thus, the [region] field of FIG. 5 is replaced by [transaction] field in FIG. 7. The transaction field is a characteristic of items sold such as quantity or type.

Examples of online attacks include purchase of tickets (e.g., concert tickets, train tickets), gift cards (e.g., membership renewals), or digital services (e.g., streaming services, online gaming, online dating) with stolen payment information. Typically, an attacker makes purchases from the same merchant using different stolen information. This can be detected as a spike in activity. For example, an online coffee shop usually sees transactions for 1000 gift cards in a week, but now in a 10-minute period sees 100 gift cards being sold. This indicates an online attack and the correlation between those 100 transactions for gift cards can be determined by applying a rule like the one shown in FIG. 7.

The real-time cluster detection techniques described above find application in a variety of settings. The following figures show examples of fraud-trip attacks that can be detected using the techniques described above.

FIG. 8A shows an example of a fraud-trip attack involving product transactions. In this example of a fraud-trip attack, a perpetrator purchases 30 iPads® at various Apple Store® locations throughout the San Francisco Bay Area. Conventional fraud detection techniques typically detect fraud when there are a large number of transactions for the same product such as a single credit card used to purchase 20 iPads®. The perpetrator may attempt to evade detection by using 15 different stolen credit cards and using each credit card only twice at each location.

The map shows a fraud trip that takes place over approximately 3 hours, beginning at an Apple Store® in Burlingame with stops at Apple Stores® in San Mateo, Palo Alto, and Stanford, and ending at an Apple Store® in Sunnyvale. The perpetrators work in a team of three to evade detection. Each person uses a credit card to make two transactions, each transaction for a single iPad®.

FIG. 8B shows an example of transactions corresponding to the fraud-trip attack shown in FIG. 8A. Each transaction is represented by a row in the table shown in FIG. 8B. A first person uses Card 1 to purchase two iPads, a second person uses Card 2 to purchase two iPads, and a third person uses Card 3 to purchase two iPads. They then drive from Burlingame to San Mateo, arriving around 11:57, when the first person uses Card 4 to purchase two iPads, the second person uses Card 5 to purchase two iPads, and the third person uses Card 6 to purchase two iPads. This trip continues until it concludes around 1:50 when the last iPad is purchased in Sunnyvale. The transaction data shown here can be collected by various transaction devices (e.g., 102-106 of FIG. 1), transmitted to an issuer 130, and stored in storage 144.

For clarity, FIG. 8B only shows those transactions corresponding to the fraud-trip attack of FIG. 8A and does not show non-correlated entries. The techniques described above may be used to determine that these transactions are potentially fraudulent because they are correlated with each other and eliminates other transactions collected during this period of time at these locations because they are not potentially fraudulent. These entries can be determined to be correlated using the techniques described above. For example, rules like the ones shown in FIG. 6 can be applied, e.g., (1) "find [Apple Store] in [last 8 hours] in [San Francisco Bay Area]," (2) "with at least [4 cards] each with [2 transactions] and [$300-$400]." Applying these rules would cause the entries shown in FIG. 8B to be found and correlated with each other. For example, entries from San Mateo that are earlier than 11:40 can be eliminated because the perpetrator would not be able to drive between Burlingame and San Mateo in such a short period of time.

FIG. 9 shows an example of a fraud-trip attack involving ATM transactions. Conventional fraud detection techniques typically detect fraud when there are a large number of transactions such as a single debit card used to make numerous withdrawals. The perpetrator may attempt to evade detection by using each stolen debit card only once at each location. In this example, 26 stolen debit cards are each used only once to withdraw an ATM maximum ($500 or $600) at 13 different locations. At each ATM location, no more than 3 stolen debit cards are used. The perpetrator travels from ATM to ATM in various cities throughout the San Francisco Bay Area, beginning at Stanford, traveling south through Palo Alto to Sunnyvale, then returning through Sunnyvale and Mountain View to Palo Alto.

These entries can be determined to be correlated using the techniques described above. For example, rules like the ones shown in FIG. 5 can applied, e.g., "find transactions with amounts [$400, $500] in [ATM] in [same zip4 region] for [ATMs with at least 2 transactions within 10 minutes]." Applying these rules would cause the entries shown in FIG. 9 to be found and correlated with each other.

Although the real-time cluster detections techniques have been described here chiefly with respect to detecting a fraud trip, the techniques also find application in detecting other patterns of behavior including online attacks.

The real-time cluster detection techniques described here improve the functioning of the computer by using less memory to quickly detect whether a transaction is potentially fraudulent. The technical field of computer-implemented security breach detection is improved by increasing the efficiency of fraud detection while using fewer computing resources. The techniques described here are not capable of being performed by a human fraud analyst because human fraud analysts tend to identify patterns of behavior that indicate fraudulent behavior, and the potentially fraudulent transactions that are detected by the techniques described here do not necessarily have a pattern recognizable by a human.

When the real-time clustering techniques described here were deployed, fraud-trip attacks were very effectively detected while consuming fewer computing resources compared with previous techniques. In one instance, in a 14-day test period, a fraud-trip detection process like the one shown in FIG. 3 was triggered more than 30 times, identifying fraud trips representing more than 400 compromised cards, more than 3000 transactions, and more than $1.7 M in fraud. All of the potentially fraudulent transactions were confirmed to be true positives, yielding 100% precision. The types of attacks that were identified include ATM-to-ATM fraud trips like the one described for FIG. 9, a sequence of department store attacks, online attacks, and distributed city-wide attacks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a computer memory configured to store transaction entries; and
    a processor in communication with the computer memory, the processor configured to:
        obtain a transaction entry from the transaction entries stored in the computer memory;
        determine a cluster of at least a subset of the transaction entries including by:
            applying a rule to the transaction entries to find correlated transaction entries from at least the subset of the transaction entries that match each other based on a time period and at least one of a source and an amount; and
            grouping the correlated transaction entries to form the cluster of at least the subset of the transaction entries based at least in part on at least the subset of the transaction entries being within (i) a first threshold time of each other, the first threshold time being determined based at least in part on geographical distance between the transaction entries and (ii) a threshold distance from each other, the threshold distance being determined based at least in part on an elapsed time between at least the subset of the transaction entries;
        determine whether the obtained transaction entry is part of a fraud-trip attack including by determining that the obtained transaction entry is not potentially fraudulent based on the obtained transaction entry not meeting a similarity measure with the cluster of at least the subset of the transaction entries, wherein the fraud-trip attack includes the cluster of at least the subset of the transaction entries with correlated geographical locations and times;
        in response to determining that the obtained transaction entry is not potentially fraudulent, determine whether the obtained transaction entry is expired;
        in response to determining that the obtained transaction entry is not expired based at least in part on a second threshold time having not elapsed, keep the obtained transaction entry in the computer memory;
        in response to determining that the obtained transaction entry is expired based at least in part on the second threshold time having elapsed, evict the obtained transaction entry from the computer memory and reduce memory usage associated with the obtained transaction entry; and
        output at least one transaction entry in the cluster of at least the subset of the transaction entries while the at least one transaction entry is occurring.

2. The system of claim 1, wherein determining whether the obtained transaction entry is potentially fraudulent includes determining that the obtained transaction entry is potentially fraudulent based at least in part on the obtained transaction entry being correlated with the cluster of at least the subset of the transaction entries; and
    in response to the determination that the obtained transaction entry is potentially fraudulent, keep the obtained transaction entry in the computer memory.

3. The system of claim 1, wherein the source includes at least one of an issuing bank, merchant, or location.

4. The system of claim 1, wherein the processor is further configured to determine that the obtained transaction entry is potentially fraudulent based on the obtained transaction entry meeting the similarity measure with the cluster of at least the subset of the transaction entries.

5. The system of claim 4, wherein determining that the obtained transaction entry is potentially fraudulent further includes:
    filtering the cluster of at least the subset of the transaction entries to remove false positives; and
    marking remaining transaction entries of the cluster of at least the subset of the transaction entries as potentially fraudulent.

6. The system of claim 1, wherein determining the cluster of at least the subset of the transaction entries further includes applying successive rules to the transaction entries, each rule including at least one condition for a field in the transaction entries.

7. The system of claim 1, wherein determining the cluster of at least the subset of the transaction entries further includes applying a second rule to the transaction entries including at least one of: number of payments types used, number of transactions, and transaction amount.

8. The system of claim 1, wherein the cluster of at least the subset of the transaction entries identified to be fraudulent are related by dimension and time.

9. The system of claim 1, wherein the cluster of at least the subset of the transaction entries identified to be fraudulent are related by dimension, time, and geographical region.

10. The system of claim 1, wherein determining that the obtained transaction entry is not potentially fraudulent is performed in real time.

11. The system of claim 1, wherein the cluster of at least the subset of the transaction entries is not determined based on profile-based metrics.

12. The system of claim 1, wherein the processor is further configured to output a notification to evict the obtained transaction entry including blocking a payment type associated with the obtained transaction entry from being used.

13. The system of claim 1, wherein the processor is further configured to:
    determine an anticipated transaction including at least one of a location and a time of the anticipated transaction; and
    preempt the anticipated transaction including by preventing a payment type to be accepted.

14. The system of claim 1, wherein the obtained transaction entry determined to be potentially fraudulent is part of an online attack.

15. A method, comprising:
- obtaining a transaction entry from transaction entries stored in a computer memory;
- determining a cluster of at least a subset of the transaction entries including by:
  - applying a rule to the transaction entries to find correlated transaction entries from at least the subset of the transaction entries that match each other based on a time period and at least one of a source and an amount; and
  - grouping the correlated transaction entries to form the cluster of at least the subset of the transaction entries based at least in part on at least the subset of the transaction entries being within (i) a first threshold time of each other, the threshold time being determined based at least in part on geographical distance between the transaction entries and (ii) a first threshold distance from each other, the threshold distance being determined based at least in part on an elapsed time between at least the subset of the transaction entries;
- determining whether the obtained transaction entry is part of a fraud-trip attack including by determining that the obtained transaction entry is not potentially fraudulent based on the obtained transaction entry not meeting a similarity measure with the cluster of at least the subset of the transaction entries, wherein the fraud-trip attack includes the cluster of at least the subset of the transaction entries with correlated geographical locations and times;
- in response to determining that the obtained transaction entry is not potentially fraudulent, determining whether the obtained transaction entry is expired;
- in response to determining that the obtained transaction entry is not expired based at least in part on a second threshold time having not elapsed, keep the transaction entry in the computer memory;
- in response to determining that the obtained transaction entry is expired based at least in part on the second threshold time having elapsed, evict the obtained transaction entry from the computer memory and reduce memory usage associated with the obtained transaction entry; and
- outputting at least one transaction entry in the cluster of at least the subset of the transaction entries while the at least one transaction entry is occurring.

16. A computer program product embodied in a non-transitory computer readable storage medium and comprising computer instructions for:
- obtaining a transaction entry from transaction entries stored in a computer memory;
- determining a cluster of at least a subset of the transaction entries including by:
  - applying a rule to the transaction entries to find correlated transaction entries from the transaction entries that match each other based on a time period and at least one of a source and an amount; and
  - grouping the correlated transaction entries to form the cluster of at least the subset of the transaction entries based at least in part on at least the subset of the transaction entries being within (i) a first threshold time of each other, the threshold time being determined based at least in part on geographical distance between the transaction entries and (ii) a first threshold distance from each other, the threshold distance being determined based at least in part on an elapsed time between at least the subset of the transaction entries;
- determining whether the obtained transaction entry is part of a fraud-trip attack including by determining that the obtained transaction entry is not potentially fraudulent based on the obtained transaction entry not meeting a similarity measure with the cluster of at least a subset of the transaction entries, wherein the fraud-trip attack includes the cluster of at least the subset of the transaction entries with correlated geographical locations and times;
- in response to determining that the obtained transaction entry is not potentially fraudulent, determine whether the obtained transaction entry is expired;
- in response to determining that the obtained transaction entry is not expired based at least in part on a second threshold time having not elapsed, keep the obtained transaction entry in the computer memory;
- in response to determining that the obtained transaction entry is expired based at least in part on the second threshold time having elapsed, evict the obtained transaction entry from the computer memory and reduce memory usage associated with the obtained transaction entry; and
- outputting at least one transaction entry in the cluster of at least the subset of the transaction entries while the at least one transaction entry is occurring.

* * * * *